(12) United States Patent
Dernis et al.

(10) Patent No.: US 8,296,339 B2
(45) Date of Patent: Oct. 23, 2012

(54) DISK IMAGE OPTIMIZATION

(75) Inventors: Mitchell S. Dernis, Seattle, WA (US);
Dennis Mooney, II, Duvall, WA (US);
Erich M. Pleny, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1059 days.

(21) Appl. No.: 12/165,293

(22) Filed: Jun. 30, 2008

(65) Prior Publication Data
US 2009/0323491 A1 Dec. 31, 2009

(51) Int. Cl.
*G06F 17/30* (2006.01)
(52) U.S. Cl. ........... 707/828; 711/111; 711/200; 369/83
(58) Field of Classification Search .................. 707/821, 707/831, 999.107, 999.205; 711/112, 165, 711/170, 202, 200; 369/83
See application file for complete search history.

(56) References Cited

U.S. PATENT DOCUMENTS

| | | | |
|---|---|---|---|
| 5,931,734 A | 8/1999 | Nakatani | 436/23 |
| 6,226,241 B1 | 5/2001 | D'Amato | 369/47.15 |
| 6,338,680 B1 | 1/2002 | Connors | 436/43 |
| 6,829,618 B1 | 12/2004 | Abraham | 707/104.1 |
| 6,910,116 B2 | 6/2005 | Lange | 711/170 |
| 2002/0015252 A1* | 2/2002 | Noble et al. | 360/72.1 |
| 2003/0221053 A1* | 11/2003 | Lange et al. | 711/112 |
| 2007/0026918 A1 | 2/2007 | Sheats | 463/3 |
| 2007/0060248 A1 | 3/2007 | Rodgers | 463/16 |
| 2008/0235477 A1* | 9/2008 | Rawson | 711/165 |
| 2008/0301396 A1* | 12/2008 | Hamada et al. | 711/202 |

OTHER PUBLICATIONS

"Microsoft Releases Update to XNA Game Studio Express," Xbox Solution, http://www.xboxsolution.com/2007/04/24/microsoft-releases-update-to-xna-game-studio-express/, 2007, 4 pages.
Banks et al., "InvIncrements: incremental Software to Support Visual Simulation," Florida State University, http://www.websrv.cs.fsu.edu/~banks/papers/invIncrements.pdf, downloaded 2008, 7 pages.
Patel, A., "Blob Games: Notes," Stanford University, http://www-cs-students.stanford.edu/~amitp/simblob/economy.html, 2007, 14 pages.

* cited by examiner

*Primary Examiner* — Dennis Truong
(74) *Attorney, Agent, or Firm* — Woodcock Washburn LLP

(57) ABSTRACT

Incremental optimizations and modifications to a disk image can be made after the initial generation of the disk image. In the case of video games, publishers who have access only to a final game image can use the invention to make small improvements to the game disc image without the original game assets and without incurring the cost of generating an entirely new disc image. A mapping data structure represents physical locations of data on disk. The mapping data structure is modified with an editor, and the resulting modified layout is tested using an emulator that emulates interaction between a computer readable medium with the modified layout and computer hardware.

20 Claims, 3 Drawing Sheets

DISK IMAGE OPTIMIZATION

BACKGROUND

When large amounts of data are stored on a computer readable medium, such as an optical disk, and when such data needs to be accessed quickly, it is advantageous to arrange the physical placement of the data on the computer readable medium so that it can be accessed as quickly as possible. For example, modern video games contain large amounts of high-definition graphics data, which needs to be loaded in real time from the disks as needed so that the game playing experience is not adversely slowed. It is advantageous to arrange the physical locations of the various video game files so as to minimize seek time by hardware that reads the data from the video game disk.

Software exists that makes it possible to lay out individual locations of files on a disk so that the data reads are as efficient as possible. However, in a production process where such disks are to be mass produced and distributed to the public, organizing the data using such software is not the last step in the production chain. Once the data is organized using such software, the disk image is typically handed off to a test team to verify that the disk image has the exact contents and performance characteristics required. However, using current systems, once the layout has been created, no further updates to the disk image can be made without regenerating the entire disk image, which is slow due the large amount of data involved, and which also requires very large amounts of processing and memory resources.

In the case of video game production, not being able to make incremental changes to a game disk image makes the game submission process for a title costly. Oftentimes, those who initially create the game disk image are not the ones that test or ultimately sign off on the final disk image. This means that when modifications need to be made to a game disk image, access to the original source data and the rerunning of the entire game disk layout and generation process is presently required. In today's industry of game studios producing games for publishers who often have their own testing teams, this round trip process can be costly and introduce the risk of not meeting the sensitive holiday deadlines.

SUMMARY

In consideration of the above-identified shortcomings of the art, the present invention provides systems and methods for enabling incremental optimizations & modifications to a disk image after the initial generation of the disk image. In the case of video games, publishers who have access only to a final game image can use the invention to make small improvements to the game disc image without the original game assets and without incurring the cost of generating an entirely new disc image.

In one embodiment, a method for optimizing physical locations of data on computer readable storage media is provided. The method comprises reading data comprising a plurality of files from a first computer readable storage medium, for example reading the files of a video game from a video game disk submitted for testing. A directory of said plurality of files is built showing relationships between the plurality of files. The directory shows logical relationships between files, regardless of their physical location on disk. The directory may be built from scratch, or built by reading a directory from the video game disk. A mapping data structure is also built that represents physical locations of said plurality of files on said computer readable storage medium such as the video game disk. An editor tool then exposes an editor user interface configured to modify the mapping data structure. A user interacts with the editor to rearrange the physical locations of files. The editor thus receives commands for modifying physical locations the plurality of files, and updates said mapping data structure in accordance with said commands. The modified disk layout represented by the modified mapping data structure is tested using an emulator. The emulator emulates interaction between an emulated computer readable storage medium, with data arranged according to the modified disk layout, and emulated computing system hardware for reading from said emulated computer readable storage medium. Based on the emulated interaction, it can be determined whether to accept said updated mapping data structure, or whether to continue with further modifications to the disk layout.

Other advantages and features of the invention are described below.

BRIEF DESCRIPTION OF THE DRAWINGS

The systems and methods for disk image optimization in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
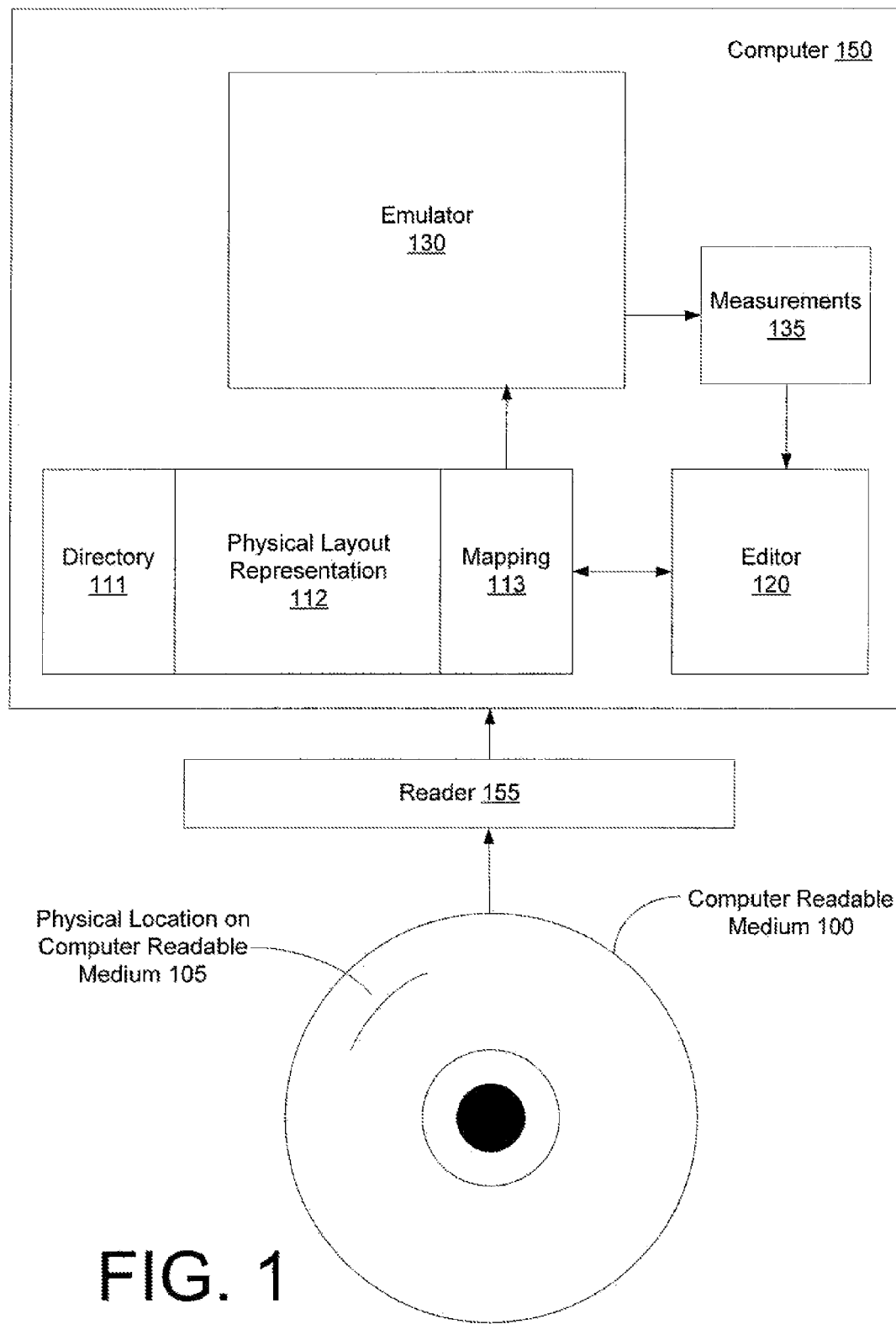
FIG. 1 is a schematic illustration of a disk 100, reader 155, and computer 150 configured to optimize a disk image initially presented via disk 100.

FIG. 1 illustrates an exemplary embodiment in which a computer system 150 is equipped to optimize physical locations of data on computer readable storage media. In general, the computer system 150 is equipped with an editor 120 and an emulator 130. A mapping data structure 113 is built that represents the physical locations of files on a disk 100. The editor 120 can then be used to modify the mapping data structure 113. The modified mapping 113 is tested using the emulator 130, which emulates interaction between a disk that is laid out according to the modified mapping 113, and computer hardware. Based on the emulation, the mapping can be accepted, rejected, or further modified using the editor 120 as necessary. Once a satisfactory mapping 113 is reached, the mapping 113 can be used to produce a final image for computer readable media to be published.

The computer system 150 comprises computer hardware 155 for reading from a first computer readable medium 100, said first computer readable medium 100 comprising a plurality of files, each file with a physical location such as exemplary location 105 on said first computer readable medium 100. The computer readable medium 100 illustrated in FIG. 1 is an optical disk which may be for example in the form of a Digital Versatile Disk (DVD). The invention is not limited to this type of computer readable medium, however. Other exemplary forms of computer readable media are RAM, ROM, EEPROM, flash memory or other memory technology, CD-ROM, or other optical disk storage, magnetic cassettes, magnetic tape, magnetic disk storage or other magnetic storage devices, or any other medium which can be used to store the desired information and which can accessed by computer 200. Upon reading the first computer readable medium 100, the computer system 150 can build the data structures 111, 112, and 113, as described below.

The computer system 150 may further comprise a second computer readable medium (refer for example to 203 in FIG. 2) and processor (refer for example to 202 in FIG. 2) for processing instructions retrieved from said second computer readable medium 203. The second computer readable medium 203 may comprise, for example, a hard drive or main storage and/or active memory for the computer system 150 from which the computer system 150 typically retrieves program instructions to be executed. Of course it will be appreciated that computers are capable of executing programs stored in locations other than on their local hard drive, and the invention is not limited to such embodiments.

The hard drive may comprise instructions corresponding to the various modules illustrated inside computer 150 in FIG. 1. These modules include an editor tool 120 and an emulator 130. The computer system 150 interacts with the data structures 111, 112, and 113 by processing instructions corresponding to modules 120 and 130.

In one embodiment, the editor tool 120 can be launched by a user of computer system 150 for the purpose of viewing and modifying a layout of data represented by the data structures 111, 112, and 113. Initially, the data structures 111, 112, and 113 correspond to the layout of data on the first computer readable medium 100. However, once the data structures 111, 112, and 113 are modified using the editor tool 120, they no longer correspond to the layout on disk 100. If a new disk with a modified layout according to the modified data structures 111, 112, and 113 is desired, then disk 100 can be overwritten or a new disk can be created.

The editor tool may thus comprise instructions for initially building a mapping data structure 113 that represents physical locations of a plurality of files on disk. Data for building this mapping data structure may be acquired from the disk 100. For example, in one embodiment, a number of files on disk 100 may be packaged into larger compressed files, such as the well-known ZIP files. Each such larger file may be designed to contain a section that maps an offset in such larger file to a physical location on the disk 100. The mapping data structure 113 may be built using this information. If there exists just one larger file on disk 100, then building the mapping data structure 113 is a matter of inspecting the file offset mappings of that one file. If there are multiple larger files, then of course all of the multiple file offset mappings will be inspected to build the mapping data structure 113.

More generally, building the mapping data structure can comprise an activity as simple as reading a precompiled mapping structure from the disk 100 in to the active memory of the computer system 150, or as complicated as actually parsing the disk 100 file by file to determine the physical locations of each file and then representing that information in the computer system 150 active memory. The approach described above using the file offset mappings is an intermediate approach in which file offset mappings are used to help in the building of the mapping data structure 113.

Another data structure that may be built by the editor tool 120 from the disk 100 is the directory 111. In one embodiment, the directory is a familiar "tree" structure showing the logical relationships between the various files on the disk 100. For example, where a number of files are packaged into a larger file, the directory 111 can show the larger files, each with its various subfiles depicted underneath. In one embodiment, the editor tool 120 is designed to modify the mapping data structure 113, but not the directory 111. However, changes to the mapping 113 does require small, in-place modifications to the directory 111 to properly reference the various files in their correct locations, and the editor tool is configured to make these modifications by changing a directory data structure 111 in the computer system 115 active memory as necessary. In other embodiments, features of an editor tool 120 that modify the directory structure 111 itself are of course feasible and foreseeable, and within the scope of the invention.

The editor 120 may also build a physical layout representation 112, which initially represents the layout of files on the disk 120 but then is modifiable by the user as the user interacts with the editor 120. Physical layout representation 112 reflects the layout of data on disk 100 without necessarily being an exact spatial match of such data. For example, data on an optical disk is laid out along a circular path that spirals around the disk. Data in the physical layout representation 112 may be more readable if it presents the data in linear horizontal rows, depicting where one file stops and another begins, and any unused space in-between. It will be appreciated that physical layout representation 112 may represent the physical location of data on a computer readable medium any number of useful ways without necessarily presenting an exact spatial match to physical layout of data on a particular computer readable medium.

The editor 120 may further comprise instructions for receiving commands to modify the mapping data structure 113. For example, editor 120 can present a user interface on a display device that presents the data structures 111, 112, and 113 side-by-side as they are illustrated in FIG. 1. The user interface can allow the user to provide commands for modifying the mapping data structure 113, and can include appropriate instructions for updating said mapping data structure in accordance with said commands, thereby producing a modified mapping data structure 113, layout representation 112, and directory 111 in response to such commands. In one embodiment, the editor 120 user interface can allow the user to "drag and drop" files to new locations within the layout representation 112 area of the user interface. Other means for receiving commands are also available, such as exposing command menus, processing keyboard, mouse, touch screen, or voice inputs, and the like. In general, a change to the data structures 111, 112, and 113 as represented in the editor 120 user interface can cause a modification of those data structures as they are stored in computer system 150 memory and vice versa.

Finally, the editor 120 may include instructions for initiating an emulation by the emulator 130. In such an embodiment, the editor 120 may launch the emulator 130 and pass the modified data structures to the emulator 130. In a different embodiment, the user may launch the emulator and point the emulator to a desired data structure, e.g. a data structure saved from the editor 120, for an emulation operation.

Once the emulator 130 is done with emulation, any measurements 135 or other results may be "automatically" passed back to the editor 120, which can then display this information, or, in a different embodiment, the emulator may display the measurements to the user via its own user interface, and the user may then go back to the editor for further editing. Thus there may be differing levels of cooperation between the emulator 130 and the editor 120 as desired for the optimal user experience.

The emulator 130 is used to test the modified data structure generated via the editor 120. The emulator 130 includes instructions for emulating interaction between an emulated computer readable medium and emulated computer hardware for reading said emulated computer readable medium. The emulated computer readable storage medium is configured according to the modified mapping data structure 113, i.e., comprising a plurality of files in physical locations corresponding to said modified mapping data structure. Because the emulator 130 emulates a disk, rather than using an actual physical disk, the use of the emulator eliminates the need to produce a new disk with the modified layout.

The emulator 130 emulates interaction between an emulated computer readable medium and emulated computer hardware using software that executes on either the processor of the computer system 150 or on the processor of a special purpose device or other computer system for the purpose of performing such emulation. Emulation of hardware using software can be accomplished, for example, by analyzing the properties and operations of hardware to be emulated, and programming the software to reproduce the same properties and operations as would be produced by the physical hardware.

Also, in conjunction with emulation operations, the emulator 130 may measure and test the emulation as it is performed. In the case of video games and many other applications, one important property to test is the speed of various operations using the modified disk layout. While a modified layout may speed up certain operations, it may unacceptably slow other operations. Thus a variety of operations may be measured for speed, in order to determine the overall benefit or detriment of the modified layout. These measurements may be output to a data structure 135 which can then be presented to the user via the emulator 130 or the editor 120 or a text editor or other program as desired.

Based on the measurements of the emulation operation, it can be determined, e.g., by a user, whether to accept the modified mapping data structure. If accepted, the modified data structure may be used as the published version of the computer readable media in question. An appropriate disk image may be produced, and this new and optimized disk image can be mass produced and distributed, or sent back to a developer for further updates and testing. If the modified mapping data structure is not accepted, it may be rejected by returning to a mapping data structure corresponding to that of the original disk 100, or it may be further modified and optimized using the editor 120.

Figure 2:
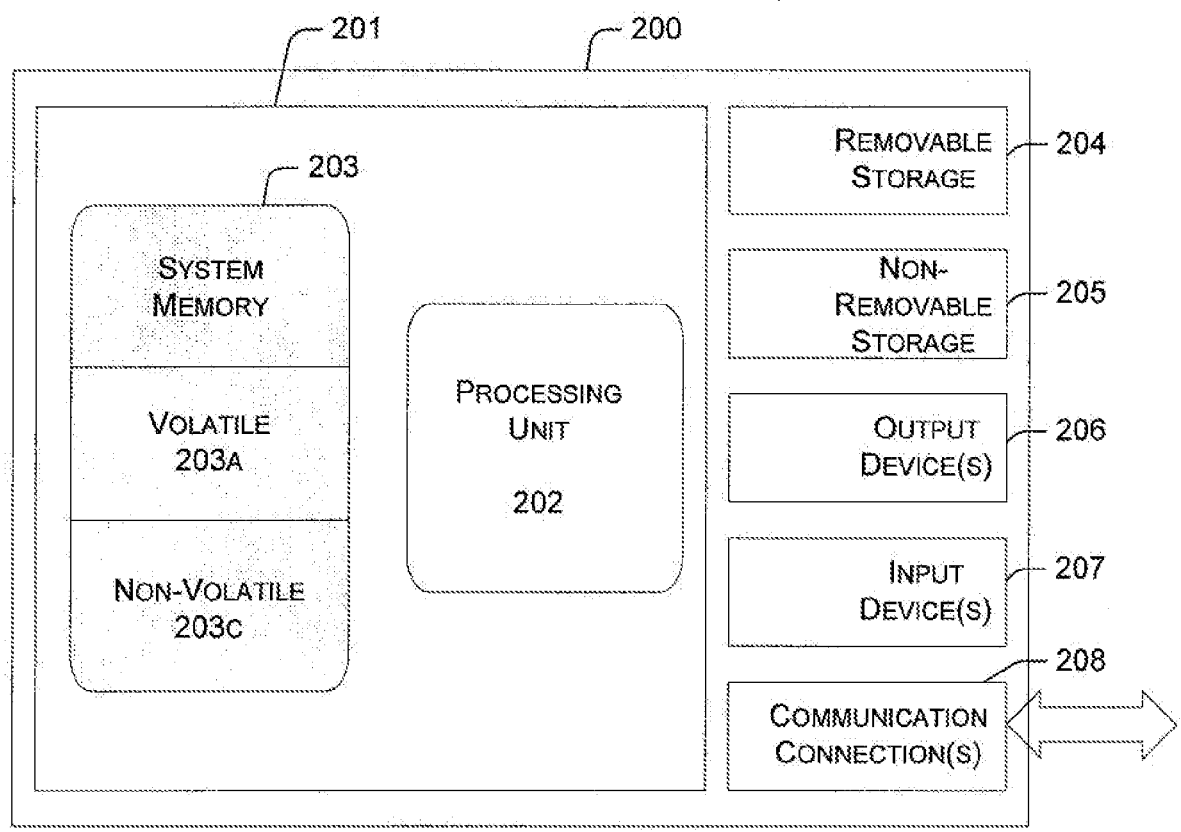
FIG. 2 is a general schematic representation of a computing device as may be utilized for example as computer 150 presented in FIG. 1.

With reference to FIG. 2, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Computer 200 typically includes a variety of computer readable media. Computer readable media can be any available media that can be accessed by computer 200 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 200. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 3:
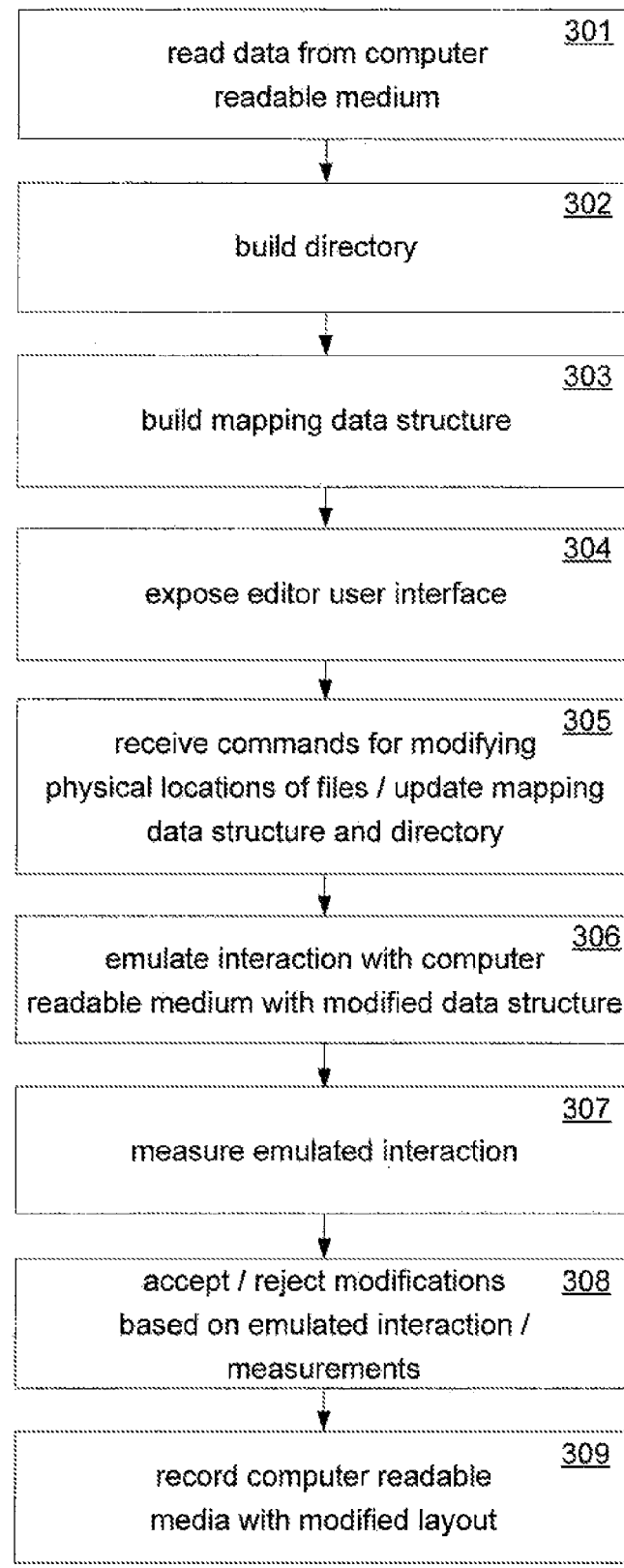
FIG. 3 illustrates a method for optimizing a layout of data on a computer readable medium.

FIG. 3 illustrates an exemplary method for optimizing physical locations of data on computer readable storage media. The method comprises reading data 301 comprising a plurality of files from a first computer readable storage medium, for example reading the files of a video game from a video game disk submitted for testing. A directory of said plurality of files is built 302 showing relationships between the plurality of files. The directory shows logical relationships between files, regardless of their physical location on disk. The directory may be built from scratch, or built by reading a directory from the video game disk.

A mapping data structure is also built 303 that represents physical locations of said plurality of files on said computer readable storage medium such as the video game disk. An editor tool then exposes an editor user interface 304 configured to modify the mapping data structure. A user interacts with the editor to rearrange the physical locations of files as reflected in the mapping data structure. The editor thus receives commands 305 for modifying physical locations the plurality of files, and updates said mapping data structure in accordance with said commands.

The modified disk layout represented by the modified mapping data structure is tested using an emulator. The emulator emulates interaction 306 between an emulated computer readable storage medium, with data arranged according to the modified disk layout, and emulated computing system hardware for reading from said emulated computer readable storage medium. The emulated interaction can be measured 307 to determine if the modified mapping data structure produces benefits in terms of access speed to the files. Based on the emulated interaction, it can be determined whether to accept 308 said modified mapping data structure, or whether to continue with further modifications to the disk layout. Finally, a physical layout that is reached through the process illustrated in FIG. 3 can be used to record computer readable media 309 with the modified layout.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided herein, the systems and methods provided herein cannot be construed as limited in any way to a particular computing architecture. Instead, the present invention should not be limited to any single embodiment, but rather should be construed in breadth and scope in accordance with the appended claims.

What is claimed is:

1. A method for optimizing physical locations of data on computer readable storage media, comprising:
reading data comprising a plurality of files from a first computer readable storage medium;
determining a directory of the plurality of files showing pre-existing logical relationships between the plurality of files as they are stored on the first computer readable storage medium;
determining a mapping data structure that represents pre-existing physical locations of said plurality of files on the first computer readable storage medium;
exposing an editor user interface comprising the directory and configured to modify the mapping data structure;
receiving via said editor a command for modifying a physical location of at least one of the plurality of files and updating said mapping data structure in accordance with the command;
emulating reading from an emulated computer readable storage medium by an emulated computing system hardware for reading from the emulated computer readable storage medium, the emulated computer readable storage medium emulating the plurality of files in physical locations corresponding to the updated mapping data structure; and
determining based on the emulating to accept the updated mapping data structure.

2. The method of claim 1, wherein emulating reading from the emulated computer readable storage medium by the emulated computing system hardware comprises:
emulating interaction between an emulated optical disc and emulated hardware for reading said optical disc.

3. The method of claim 1, wherein the data comprising a plurality of files comprises video game data.

4. The method of claim 1, further comprising:
updating said directory in place to reflect said modifying.

5. The method of claim 1, wherein said determining a directory and said determining a mapping data structure comprise:
reading a directory and mapping data structure from said first computer readable storage medium and placing said directory and mapping data structure in memory.

6. The method of claim 1, further comprising:
recording the data comprising said plurality of files on a second computer readable storage medium, physical locations of the plurality of files on the second computer readable storage medium corresponding to the updated mapping data structure.

7. The method of claim 6, wherein the second computer readable storage medium comprises an optical disc and wherein the data comprising a plurality of files comprises video game data.

8. A computer system equipped to optimize physical locations of data on computer readable storage media, said computer system comprising:
computer hardware for reading from a first computer readable medium, the first computer readable medium comprising a plurality of files, each file having a physical location on the first computer readable medium;
a second computer readable medium and processor for processing instructions retrieved from the second computer readable medium, the second computer readable medium comprising stored instructions for an editor tool and an emulator that, when executed on the processor, cause the system to at least:

determine a directory of the plurality of files showing pre-existing logical relationships between the plurality of files as they are stored on the first computer readable medium;

determine a mapping data structure that represents pre-existing physical locations of the plurality of files on the first computer readable medium;

expose an editor user interface comprising the directory and configured to modify the mapping data structure;

receive via the editor a command to modify a physical location of at least one of the plurality of files and updating the mapping data structure in accordance with the command;

emulate reading from an emulated computer readable medium by an emulated computer hardware for reading the emulated computer readable medium, the emulated computer readable medium emulating the plurality of files in physical locations corresponding to the updated mapping data structure; and determine based on the emulating to accept the updated mapping data structure.

9. The computer system of claim 8, wherein the instructions that, when executed upon the processor, cause the system to at least emulate reading from the emulated computer readable storage medium by the emulated computing system hardware further cause the system to at least:

emulate interaction between an emulated optical disc and emulated hardware for reading the optical disc.

10. The computer system of claim 8, wherein the plurality of files comprise video game data.

11. The computer system of claim 8, wherein the second computer readable medium further comprises instructions that, when executed on the processor, cause the system to at least:

measure access speeds for accessing the plurality of files in physical locations corresponding to the updated mapping data structure during the emulating.

12. The computer system of claim 8, wherein the second computer readable medium further comprises instructions that, when executed on the processor, cause the system to at least:

update the directory in place to reflect the modifying.

13. The computer system of claim 8, wherein the instructions, that, when executed upon the processor, cause the system to at least determine a mapping data structure further cause the system to at least:

read mapping data structure from the first computer readable storage medium and placing the mapping data structure in memory.

14. The computer system of claim 8, wherein the second computer readable medium further comprises instructions that, when executed on the processor, cause the system to at least:

record the data comprising the plurality of files on a third computer readable storage medium, the physical locations of the plurality of files on the third computer readable storage medium corresponding to the updated mapping data structure.

15. The computer system of claim 14, wherein the third computer readable storage medium comprises an optical disc, and wherein the data comprising a plurality of files comprises video game data.

16. A tangible computer readable storage medium comprising computer executable instructions for optimizing physical locations of data on a second computer readable storage medium, that, when executed on a computer, cause the computer to perform operations comprising:

reading data comprising a plurality of files from a first computer readable storage medium;

determining a directory of the plurality of files showing pre-existing logical relationships between the plurality of files as they are stored on the first computer readable storage medium;

determining a mapping data structure that represents pre-existing physical locations of a plurality of files on the first computer readable medium;

exposing an editor user interface comprising the directory and configured to modify the mapping data structure;

receiving via said editor a command for modifying a physical location of at least one of the plurality of files and updating said mapping data structure in accordance with the command;

emulating reading from an emulated computer readable medium by an emulated computer hardware for reading the emulated computer readable medium, the emulated computer readable storage medium emulating the plurality of files in physical locations corresponding to the updated mapping data structure; and determining based on the emulating to accept the updated mapping data structure.

17. The tangible computer readable storage medium of claim 16, wherein emulating reading from the emulated computer readable storage medium by the emulated computing system hardware comprises:

emulating interaction between an emulated optical disc and emulated hardware for reading said optical disc.

18. The tangible computer readable storage medium of claim 16, further comprising instructions that, when executed on the computer, cause the computer to perform operations comprising:

measuring access speeds for accessing the plurality of files in physical locations corresponding to the updated mapping data structure during the emulation.

19. The tangible computer readable storage medium of claim 16, further comprising instructions that, when executed on the computer, cause the computer to perform operations comprising:

recording the data comprising the plurality of files on the second computer readable storage medium, wherein physical locations of the plurality of files on the second computer readable storage medium corresponding to said updated mapping data structure.

20. The method of claim 1, wherein determining based on the emulating to accept the updated mapping data structure comprises:

determining that the emulated computing system hardware meets a minimum performance metric when reading from the emulated computer readable storage medium.

* * * * *